United States Patent [19]

Kishikawa et al.

[11] Patent Number: 5,069,953
[45] Date of Patent: Dec. 3, 1991

[54] HEAT-SHRINKABLE FOAMED COMPOSITE FILM AND PROCESS FOR PREPARATION OF SAME

[75] Inventors: Nobutaka Kishikawa, Shiga; Akira Mita; Mitsugi Satou, both of Moriyama, all of Japan

[73] Assignee: Gunze Limited, Ayabe, Japan

[21] Appl. No.: 627,912

[22] Filed: Dec. 17, 1990

Related U.S. Application Data

[63] Continuation of Ser. No. 547,366, Jul. 3, 1990, abandoned.

[30] Foreign Application Priority Data

May 17, 1990 [JP] Japan .................................. 2-127556

[51] Int. Cl.$^5$ ................................................ B32B 3/26
[52] U.S. Cl. ....................................... 428/201; 156/78; 156/229; 264/45.9; 428/203; 428/213; 428/215; 428/319.7; 428/319.9
[58] Field of Search ................... 156/78, 229; 264/45.9; 428/201, 203, 213, 215, 319.7, 319.9

[56] References Cited

U.S. PATENT DOCUMENTS

| 4,049,147 | 9/1977 | Stiles et al. | 428/319.9 |
|---|---|---|---|
| 4,273,816 | 6/1981 | Tolette | 428/319.9 |
| 4,275,112 | 6/1981 | Savage, Jr. | 428/195 |

FOREIGN PATENT DOCUMENTS

| 57-42726 | 3/1982 | Japan . | |
|---|---|---|---|
| 58-15382 | 3/1983 | Japan . | |
| 58-91538 | 6/1983 | Japan . | |
| 59-26230 | 2/1984 | Japan . | |
| 59-26245 | 2/1984 | Japan . | 428/319.7 |
| 59-49958 | 3/1984 | Japan . | |
| 62-22787 | 5/1987 | Japan . | |
| 62-95341 | 5/1987 | Japan . | |
| 62-33251 | 7/1987 | Japan . | |
| 63-43722 | 3/1988 | Japan . | |
| 63-191024 | 12/1988 | Japan . | |
| 64-10332 | 2/1989 | Japan . | |
| 64-53067 | 3/1989 | Japan . | |
| 1189362 | 4/1970 | United Kingdom | 428/319.7 |

Primary Examiner—William J. Van Balen
Attorney, Agent, or Firm—Armstrong, Nikaido, Marmelstein, Kubovcik & Murray

[57] ABSTRACT

The invention provides a heat-shrinkable foamed composite film which is a film laminate composed of: (A) a laterally monoaxially-oriented foamed film of an olefin polymer having a thickness of about 40 to about 400 $\mu$m and being heat-shrinkable predominantly in a lateral direction, (B) a laterally monoaxially-oriented film of an olefin polymer having a thickness of about 5 to about 50 $\mu$m and being heat-shrinkable predominantly in a lateral direction, and (C) a laterally monoaxially-oriented printed polyester film having a thickness of about 5 to about 50 $\mu$m and being heat-shrinkable predominantly in a lateral direction, the film laminate being formed by laminating the films (A), (B) and (C) in this order so that the printed surface of the film (C) is faced with the film (B), and the film laminate having a heat shrinkage factor of about 25 to about 50% in a lateral direction and about 0 to about 10% in a longitudinal direction under the conditions of 100° C. for 30 seconds and has a Young's modulus of about 40 to about 170 kg/mm$^2$ in a lateral direction and a tensile strength of about 5.0 to about 15.0 kg/cm in a lateral direction. The invention also provides a process for preparing the above composite film.

3 Claims, No Drawings

HEAT-SHRINKABLE FOAMED COMPOSITE FILM AND PROCESS FOR PREPARATION OF SAME

This application is a continuation of application Ser. No. 07/547,366 filed July 3, 1990.

FIELD OF THE INVENTION

The present invention relates to a heat-shrinkable foamed composite film and more particularly to a heat-shrinkable foamed composite film which is outstanding in heat shrinkability, easy to shrink by heating and aesthetically printed, and a process for preparing the same.

BACKGROUND OF THE INVENTION

Heretofore heat-shrinkable foamed films have had wide applications, for example, as sleeves for covering containers. Printing on such heat-shrinkable foamed films is usually conducted on the surface of the skin layer, i.e. the laminated layer of unfoamed film superposed on foamed film. The method adapted to print the skin frequently produces a print of poor gloss, thus rarely giving an aesthetically attractive print. This problem may be alleviated by laminating a foamed film on the printed surface of the skin. However, such film laminate poses another problem that the printed surface side can be scarcely smooth-surfaced because of the uneven surface of the foamed film and the air introduced into the film laminate in the laminating process due to the surface irregularities of the foamed film. Conventional heat-shrinkable foamed films formed from polystyrene have the drawbacks of being susceptible to impact and brittle, hence prone to damage when used for covering bottles or like containers.

To improve the printability of conventional heat-shrinkable foamed films, we proposed "a heat-shrinkable foamed composite film composed of a laminate of foamed film and unfoamed film which is superposed on a printed heat-shrinkable film" (Unexamined Utility Model Publication No. Sho 63-43722). We investigated foamed materials substituting for polystyrene and filed patent applications on the research results in Japan (Examined Patent Publications Nos. Sho 62-33251 and 62-22787 and No. Hei 1-38662) to propose foamed film laminates of olefin polymers as disclosed therein for example as "a laterally heat-shrinkable foamed composite material composed of a laminate of a laterally heat-shrinkable thermoplastic film and a laterally heat-shrinkable foamed material prepared by laterally orienting a film formed from a composition comprising an ethylene-propylene copolymer having an ethylene content of 1 to 10 mole %, a polymer for improving the flexibility (such as an ethylene-vinyl acetate copolymer, low-density polyethylene, etc.) and a foaming agent".

The proposed film laminates, however, are low in heat shrinkage factor and thus unsuitable for applications which require a higher heat shrinkage factor. Such film laminates are also defective in that they are generally limp and insufficient in rigidity and cause faults during a continuous operation for covering bottles or like containers, leading to unavoidable shutdown of the operation.

To overcome the drawbacks of the above foamed film laminates of olefin polymers, we have researched the properties of composite films for covering containers or the like which are composed of a laminate of such foamed film laminate and a heat-shrinkable film of a polymer. Yet the investigated olefin polymers had the problems of failing to improve fully the heat shrinkability of the foamed film laminate and to meet completely the rigidity requirement and giving a film of poor printability.

SUMMARY OF THE INVENTION

It is an object of the present invention to provide a highly heat-shrinkable and aesthetically printed foamed composite film and a process for preparing the same.

It is another object of the invention to provide a heat-shrinkable foamed composite film having rigidity and strength sufficient to eliminate the possibility of problems arising due to the insufficiency of these characteristics during the operation for covering containers or the like and a process for preparing the same.

These and other objects of the invention will become more apparent from the following description.

According to the present invention, there is provided a heat-shrinkable foamed composite film which is a film laminate composed of:

(A) a laterally monoaxially-oriented foamed film of an olefin polymer having a thickness of about 40 to about 400 $\mu m$, the film being heat-shrinkable predominantly in a lateral direction and being formed from a composition comprising (i) 100 parts by weight of a mixture of about 55 to about 90% by weight of at least one olefin copolymer selected from ethylene-propylene copolymers and ethylene-propylene-alpha($\alpha$)-olefin copolymers (the $\alpha$-olefin having 4 to 6 carbon atoms) having an ethylene content of about 2 to about 10 mole %, and about 10 to about 45% by weight of at least one ethylene polymer selected from low-density polyethylenes and ethylene-vinyl acetate copolymers having a vinyl acetate content of up to about 30% by weight; and (ii) about 0.2 to about 5 parts by weight of a foaming agent, (B) a laterally monoaxially-oriented film of an olefin polymer having a thickness of about 5 to about 50 $\mu m$, the film being heat-shrinkable predominantly in a lateral direction and being formed from a composition comprising an olefin polymer, and (C) a laterally monoaxially-oriented printed polyester-type film having a thickness of about 5 to about 50 $\mu m$, the film being heat-shrinkable predominantly in a lateral direction and being formed from a composition comprising a polyester mixture of about 60 to about 90% by weight of a polyester copolymer and about 10 to about 40% by weight of polyethylene terephthalate, the polyester copolymer being prepared from terephthalic acid and/or a derivative thereof as an aromatic dicarboxylic acid component and ethylene glycol and 1,4-cyclohexanedimethanol as a diol component, the amount of 1,4-cyclohexanedimethanol being about 15 to about 45 mole % based on the diol component, the film laminate being formed by laminating the films (A), (B) and (C) in this order so that the printed surface of the film (C) is disposed face-to-face with the film (B), the film laminate having a heat shrinkage factor of about 25 to about 50% in a lateral direction and 0 to about 10% in a longitudinal direction under the conditions of 100° C. for 30 seconds and has a Young's modulus of about 40 to about 170 kg/mm$^2$ in a lateral direction and a tensile strength of about 5.0 to about 15.0 kg/cm in a lateral direction.

DETAILED DESCRIPTION OF THE INVENTION

The polyester film (C) for use in the invention was developed by us and is known (Japanese Unexamined Patent Publication Sho No. 57-159618). With a high heat shrinkage factor, the film (C) singly used is rapidly shrunk when heated to a temperature of 70° to about 90° C. For this nature, the film (C) used even in combination of a foamed film laminate of olefin polymer was presumed to provide a warped print or an undulated upper fringe when rapidly shrunk in an air-heating oven or the like during the process for covering glass bottles or like containers and was consequently considered useless to achieve the objects of the invention. Nevertheless our experiments revealed that the polyester film used in combination with a foamed film laminate of olefin polymer gave the following unexpected results against our initial presumption. The polyester film makes up for the insufficiency of heat shrinkability of the foamed film laminate while the latter obviates the problem attendant on the rapid shrinking of the former at a specific temperature, so that the complementary characteristics of the two films results in production of a heat-shrinkable foamed composite film outstanding in heat shrinkage, aesthetically printed and having rigidity and strength sufficient to eliminate the possibility of problems arising during the operation for covering containers. The present invention has been accomplished on the basis of this novel finding.

The olefin copolymer to be used for the foamed film (A) in the present invention, i.e. ethylene-propylene copolymer or ethylene-propylene-$\alpha$-olefin copolymer, has an ethylene content of about 2 to about 10 mole %. If the ethylene content of the copolymer exceeds 10 mole %, the foamed material obtained is so viscous and prone to blocking, hence undesirable. On the other hand, the ethylene content of less than 2 mole % makes the resulting foamed material too close in properties to polypropylene so that the orientation of the film reduces the heat shrinkage factor of the film, rendering the film unsatisfactory as a heat-shrinkable material and leads to rupture of foam cells which tends to induce fuzzing. A preferred ethylene content is about 3 to about 8 mole %. Among useful copolymers, preferable are random copolymers having incorporated therein ethylene randomly. Useful $\alpha$-olefins are those having 4 to 6 carbon atoms such as 1-butene, 1-pentene, etc.

While the above olefin copolymers having a wide range of melt index (MI) are usable in the invention, high-MI, high-fluidity copolymers may require care in use because such copolymers give a film with foam cells prone to rupture and are difficult to form into a film. Among useful olefin copolymers, preferable are those having an MI of about 0.5 to about 8.0, and more preferable are those having an MI of about 0.8 to about 5.0.

Useful low-density polyethylenes among the ethylene polymers for conjoint use with the above olefin copolymer include high-pressure polyethylenes and straight-chain low-density polyethylenes having a density of about 0.91 to about 0.93. Useful ethylene-vinyl acetate copolymers (EVA) are those having a vinyl acetate content of not more than 30% by weight. The vinyl acetate content of over 30% by weight tends to produce adverse effects due to the superfluous properties of vinyl acetate, e.g. entailing problems such as blocking, hence undesirable. On the other hand, a lower content of vinyl acetate results in the deficiency of properties of EVA and superfluity of properties of low-density polyethylene. Consequently the vinyl acetate content of about 3 to about 20% by weight in EVA is desirable to obtain the desired properties of EVA. When the ethylene polymer, i.e. a low-density polyethylene or EVA, is mixed with the above olefin copolymer, the resulting foam cells are unlikely to break and the fine structure of the foam can be maintained. The conjoint use of the polymers also precludes the tendency to fuzz on rupture of foam cells, making it possible to retain the smooth film surface without serious damage to foam during the orientation of the film. These effects are presumably attributable to the flexibility imparted by the mixture of olefin copolymer and ethylene polymer. The mixing ratio of the polymers is about 55 to about 90% by weight, preferably about 60 to about 80% by weight, of the olefin copolymer, and about 10 to about 45% by weight, preferably about 20 to about 40% by weight, of the ethylene polymer, based on the total weight of the polymers.

Useful foaming agents include various conventional agents among which preferable are volatile agents such as pentane, butane and the like, organic agents such as hydrazine-, nitroso- and azo-type agents and the like, and inorganic agents such as sodium bicarbonate, ammonium carbonate and the like. More preferred are azodicarbonamide, azobisisobutyronitrile and like azo type-agents, sodium bicarbonate, ammonium carbonate and like carbonates among the inorganic agent. When required, the carbonates can be used conjointly with citric acid, tartaric acid or like organic acids. The amount of the foaming agent used is about 0.2 to about 5 parts by weight, preferably about 0.5 to about 2 parts by weight, per 100 parts by weight of the total polymers. The foaming agent is used in a manner not specifically limited. For example, the agent may be blended with the polymers in an extruder or kneaded therewith in a kneader before extrusion or in the form of a master pellet containing a concentrated foaming agent.

The foamed film (A) of the olefin polymer can be prepared by forming a foamed film from the composition comprising the above olefin copolymer, ethylene copolymer and foaming agent in a conventional manner. The composition may contain suitable additives and fillers, etc. in addition to the above three components. For example, proper additives such as a lubricant, antistatic agent and the like can be used to improve some properties when so required. A pigment added when required can impart the desired color to the film.

According to the present invention, the film (B) is formed on the surface of the foamed film (A) to improve the surface state thereof. The film (B) may be, for example, heat-shrinkable, laterally monoaxially oriented films of thermoplastic olefin polymers commonly employed. Specific examples of such polymers are low-, medium- and high-density polyethylenes, straight-chain low-density polyethylenes, polypropylenes, polybutenes and ethylene-$\alpha$-butene copolymers, propylene-$\alpha$-butene copolymers and like copolymers of olefins, copolymers of olefins and other monomers copolymerizable therewith such as ethylene-ethyl acrylate copolymers, ionomers, ethylene-vinyl acetate copolymers, modified polyolefin copolymers, etc. These polymers are usable singly or at least two of them can be used in mixture. It is preferable to use as an olefin polymer for forming the film (B) the same olefin polymers as used for forming the foamed film (A). Preferred examples of olefin polymers for forming the foamed film (A) are ethylene-propylene copolymers and ethylene-propylene-α-olefin copolymers having an ethylene content of about 2 to about 10 mole %, low-density polyethylene, ethylene-vinyl acetate copolymers having a vinyl acetate content of up to 30% by weight and the like. When these polymers are used, the foamed film (A) can be united directly with the film (B) without need of an anchor coat, hence very convenient. When the olefin polymer for forming the the film (B) is different from the polymer for forming the film (A), the former is preferably compatible with the latter although without specific limitation, and can be used if poor in compatibility therewith. Suitable additives and fillers and the like can be incorporated into the film (B) as in the foamed film (A). When required, a lubricant, antistatic agent and the like can be used to improve some properties. A pigment optionally added can provide the desired color.

The polyester film (C) to be used in the invention is formed from a mixture of a polyester copolymer and polyethylene terephthalate. The polyester copolymer is prepared from terephthalic acid and/or a derivative thereof such as dimethyl or diethyl terephthalate as an aromatic dicarboxylic acid component, and ethylene glycol and 1,4-cyclohexanedimethanol as a diol component, the amount of 1,4-cyclohexanedimethanol being about 15 to about 45 mole %, preferably about 25 to about 35 mole %, based on the diol component. The polyethylene terephthalates to be used conjointly with the polyester copolymers include those having a film-forming property and conventional in the art. The mixing ratio of polyester copolymer and polyethylene terephthalate is about 60 to about 90% of the former and about 10 to about 40% by weight of the latter, preferably about 65 to about 85% by weight of the former and about 15 to about 35% by weight of the latter. If over 90% by weight of polyester copolymer is used, the obtained film tends to have markedly low strength, poor feeling and unsatisfactory rigidity, hence undesirable. If less than 60% by weight of such copolymer is used, the resulting film is not shrunk as desired in a low temperature range, hence undesirable. When required, the polyester film (C) may contain, of course, various kinds of such third component as optionally incorporated in the foamed film (A) and the olefin polymer film (B).

The film laminate of the present invention is composed of the foamed film (A), olefin polymer film (B) and printed polyester film (C), each formed from the above materials, oriented and united in superposition in the above order with or without an adhesive applied therebetween so that the printed surface of the film (C) is positioned face-to-face with the film (B). The thickness of the film (A) is about 40 to about 400 μm, preferably about 60 to about 300 μm. The thickness of the film (B) is about 5 to about 50 μm, preferably about 15 to about 30 μm. The thickness of the film (C) is about 5 to about 50 μm, preferably about 15 to about 30 μm. If the thicknesses of constituent films are outside the above ranges, the heat-shrinkable foamed composite film of the invention can not be formed. It is utterly characteristic that the composite film of the invention exists based on a balance of thickness between the constituent films.

The heat-shrinkable foamed composite film of the invention has a heat shrinkage factor of about 25 to about 50%, preferably about 28 to about 40%, in a lateral direction and 0 to about 10%, preferably about 2 to about 8%, in a longitudinal direction, as determined under the conditions of 100° C. for 30 seconds (glycerin bath). The composite films having a heat shrinkage factor outside the above ranges are unsuitable as a cover on containers. If the composite film has a higher heat shrinkage factor than the above range, heat shrinking tends to occur rapidly, causing a likelihood of problems in the heat shrinking procedure. Presumably the film is given a slight heat shrinkability in a longitudinal direction since a low stress is applied in this direction when the film is laterally monoaxially oriented. The composite film of the invention has a Young's modulus of about 40 to about 170 kg/mm$^2$, preferably about 100 to about 150 kg/mm$^2$, in a lateral direction. The film higher in Young's modulus than this range is too rigid, hence undesirable. On the other hand, the film lower in Young's modulus than this range is unsatisfactory in the required rigidity and entails difficulty in insertion (or covering) of the film in the operation for covering containers, hence unsuitable. The composite film of the invention has a tensile strength of about 5.0 to about 15.0 kg/cm, preferably about 10.0 to 13.0 kg/cm, in a lateral direction. When used, e.g. as a sleeve for glass bottles, the film lower in tensile strength than this range is unable to prevent effectively the fracture of bottles and the scattering of glass fragments on fracture.

The longitudinal direction referred to herein corresponds to the machine direction of a film-forming extruder (extrusion direction). The lateral direction represents a direction perpendicular to the machine direction of the extruder. The Young's modulus indicated herein is according to ASTM-D882, and the tensile strength according to JIS-K 6732.

The heat-shrinkable foamed composite film of the invention is useful as sleeves for covering the outer surface of glass bottles, plastic containers, metal cans and like containers, and is particularly suitable for covering glass bottles because of its shock absorbing ability and its ability to effectively prevent the fracture of bottles and the scattering of glass fragments on fracture. The heat-shrinkable foamed composite film of the invention is usable for other various purposes including general packaging and is expected to find a further extended applications without limitation.

Desirable modes of the process for preparing the heat-shrinkable foamed composite film of the invention will be discussed below. A preferred process comprises, for example, forming a foamed film by means of an extruder, forming a film of olefin polymer over the foamed film by melt extrusion to give a film laminate and laterally orienting the film laminate. This process will be described below in more detail.

A composition comprising specified amounts of an ethylene-propylene copolymer or like olefin copolymer having an ethylene content of about 2 to about 10 mole %, a low-density polyethylene and/or a specific EVA and a foaming agent is forced out as a flat sheet from the die of an extruder adjusted to operational conditions for avoiding the foaming of the composition within the die and is foamed on extrusion to provide a foamed film (foamed sheet). The foamed sheet is made into a foamed film (A) with a thickness of about 40 to about 400 μm by subsequent orientation, and thus has a thickness sufficient to give this range of thickness to film (A). The foamed but unoriented sheet is hereinafter referred to as "foamed sheet (A1)". A thermoplastic resin comprising as the main component an ethylene-propylene copolymer or like olefin copolymer containing about 2 to about 10 mole % of ethylene, e.g. the same kind of the copolymer as used for the foamed film, is forced out onto the foamed sheet by melt extrusion to provide an olefin polymer layer. The layer thus formed is intended to produce an olefin polymer film having a thickness of about 5 to about 50 μm by succeeding orientation and is hereinafter referred to as "olefin polymer film (B1)". The olefin polymer film (B1) can be easily united with the foamed sheet (A1) into an integral laminate by means of simple nip rolls due to the heat emitted on extrusion. Then the resulting film laminate is laterally monoaxially oriented by a tenter, thereby producing a foamed olefin polymer laminate of films (A) and (B). The orientation serves to more firmly bond the film (A) with the film (B), leading to formation of a laminate of substantially inseparable films like a single sheet. The orienting temperature is determined over a suitable range of, e.g. about 90° to about 130° C. The film is stretched by orientation to about 2 to about 8 times, preferably about 3 to about 6 times, the original size. The orientation under the above conditions gives a foamed olefin polymer film laminate which is heat-shrinkable predominantly in a desirable lateral direction. The thickness of the obtained film laminate is about 45 to about 450 μm, preferably about 75 to about 330 μm, namely in the range of the sum of the thicknesses of the films (A) and (B). The olefin polymer film (B1) can be joined to the foamed sheet (A1) for lamination by other methods. For example, the film (B1) containing at least one of the same olefin polymers as used for the foamed sheet (A1) may be prepared beforehand and pressed on the foamed sheet (A1) by nip rolls or like means on foaming of the sheet (A1) being forced out from the die. In this lamination, the two films can be easily joined together into an integral laminate due to the residue of the heat generated in the foamed film (A) during the extrusion. Even if the film (B1) is made of different kinds of olefin polymer, the above method can be conducted insofar as the film (B1) has a thermal adhesion with the foamed sheet (A1). The film is foamed preferably on formation thereof but of course optionally after or before formation thereof or even on orientation.

The polyester film (C) is produced as follows. A composition comprising specific amounts of a polyester copolymer and polyethylene terephthalate is forced out from an extruder die in the shape of a flat sheet and the resulting film is laterally monoaxially oriented by a tenter. The orienting temperature can be suitably determined but is usually in the range of about 70° to about 100° C. The stretching degree is about 2 to about 8 times, preferably about 3 to about 6 times, the original size.

When required, the film (C) may be subjected to a proper mode of surface treatment such as corona discharge treatment to improve the printability.

The polyester film thus obtained is, if necessary, slit to the desired width and printed by conventional printing means including gravure, offset printing and like printing processes, giving a printed polyester film according to the invention.

The above heat-shrinkable foamed film laminate and the polyester film may be produced by forming a tubular film and cutting the film before use. The film-forming method is not critical.

Subsequently the foamed film laminate is joined, on the side of the film (B), to the printed surface of the polyester film (C) with or without use of an adhesive. Useful adhesives are preferably two-component adhesives of the chemical reaction type, more preferably those of the addition reaction type to be produced by reacting the main component having hydroxyl group in the terminal with a curing agent having isocyanate group. Among the above adhesives, it is suitable to use those comprising the main component such as saturated or unsaturated polyester or polyurethane and a curing agent such a tolylene diisocyanate or hexamethylene diioscyanate. Also usable are one-component chemical reaction type adhesives, thermoplastic resin-type adhesives and the like. The adhesive is applied preferably onto the film (C) but may be applied onto the film (B) or onto both the film (B) and the film (C).

The amount of the adhesive to be applied is not critical and is suitably determinable without specific limitation. An excess amount of adhesive dissolved in a solvent results in the decrease of drying efficiency because of a large amount of solvent used. The amount of the adhesive to be used is determined according to the desired bonding strength. The amount ranges, for example, from about 1.0 to about 10.0 g/m$^2$, preferably from about 1.5 to about 5.0 g/m$^2$.

Preferred adhesives are solvent-type adhesives to be dissolved in a solvent before use, but are not specifically limited. The adhesives of the type to be dissolved in a solvent may be suitably used, as by applying a predetermined amount onto the printed surface of the film (C). The lamination method using an adhesive is carried out, for example, by applying a specific amount of an adhesive onto the printed surface of the polyester film by proper means such as gravure printer or roll coater, evaporating off the solvent by passing the film through a drying oven, and joining together the films by pressing means such as nip rolls (when required with heating) to produce a film laminate. Examples of the solvent for dissolving the adhesive are not specifically limited and include ethyl acetate, toluene and the like.

The heat-shrinkable foamed composite films of the invention are produced preferably by the processes as detailed above. Among the composite films thus produced, preferable are those having heat shrinkability, Young's modulus and tensile strength in the foregoing ranges. Nevertheless the heat-shrinkable foamed composite films with the above characteristics outside the specified ranges can be used in the invention depending on applications.

The process for preparing the heat-shrinkable foamed composite film of the invention is not specifically limited to the processes described above and can be any of processes. For example, the films (A), (B) and (C) may be joined together with an adhesive. Optionally the films (A) and (B) may be produced by co-extrusion. The invention include other various modes of process. However, the films (B) and (C) which tend to be difficult to attach together directly may be joined together with an adhesive or through another film of adhesive resin interposed therebetween or after surface treatment of the films (B) and/(C). The invention includes all of such procedures and methods. The extent of orientation is not critical. The film laminates heat-shrinkable predominantly in a lateral direction and having the contemplated properties are all within the scope of the invention.

EXAMPLE 1

A film-forming extruder was charged with 100 parts by weight of a mixture of 65% by weight of an ethylene-propylene random copolymer containing 4.5 mole % of ethylene and 35% by weight of an ethylene-vinyl acetate copolymer containing 5% by weight of vinyl acetate and 5 parts by weight (including 1 part by weight of foaming agent component) of a master pellet consisting of sodium bicarbonate, citric acid and low density polyethylene as the main component. A foamed sheet (A1) of 400 μm thickness was produced by forcing out the contents in the shape of a flat sheet from the extruder die and foaming the film on extrusion. An olefin polymer film (B1) of 100 μm thickness was produced by forcing out an ethylene-propylene random copolymer containing 4.5 mole % of ethylene in a sheet form by melt extrusion directly onto the foamed sheet (A1) to give a laminate. The foamed sheet (A1) was found to have sticked to the film (B1) to some extent due to the residue of the heat emitted during the extrusion of film (B1). The laminate thus obtained was laterally monoaxially stretched to 5 times the original size by a tenter at a temperature of 110° C., giving a film laminate of 100 μm thickness consisting of the foamed film (A) of 80 μm thickness and the olefin polymer film (B) of 20 μm thickness. The foamed film (A) and the olefin polymer film (B) became markedly adhered to each other during the orientation and was found heat-shrinkable predominantly in a lateral direction, hence desirable. Forced through a T-die was a mixture of 77% by weight of a polyester copolymer derived from terephthalic acid as an aromatic dicarboxylic acid and ethylene glycol and 1,4-cyclohexanedimethanol (molar ratio of 1,4-cyclohexane dimethanol to ethylene glycol of 30:70) as a diol component and 23% by weight of polyethylene terephthalate derived from terephthalic acid and ethylene glycol, giving a film. The film was laterally monoaxially oriented to 4.3 times the original size by a tenter at 90° C., giving a film (C) of 20 μm thickness heat-shrinkable predominantly in a lateral direction. The desired gravure was made on one surface of the film (C) thus obtained.

The foamed laminate of films (A) and (B) was joined to the polyester film (C) with an adhesive so that the printed surface of the film (C) was faced with the film (B), whereby the heat-shrinkable foamed composite film of the invention consisting of films (A), (B) and (C) was produced. The adhesive used was a two-component addition reaction type one comprising polyester-polyol as the main component and hexamethylene diisocyanate as a curing agent. The adhesive was dissolved in ethyl acetate before use.

In this example, the above adhesive was applied to the printed surface of the polyester film (C) in an amount of about 2.5 kg/m² in terms of the adhesive component by a gravure printer and dried to evaporate off the solvent. A dry lamination method setting the printed surface of the film (C) as disposed face-to-face with the side of film (B) in the laminate of films (A) and (B), whereby a heat-shrinkable foamed composite film was produced according to the invention.

EXAMPLES 2 AND 3

A foamed laminate of films (A) and (B) was prepared in the same manner as in Example 1 with the exception of using a foamed film (A) with a thickness of 210 μm (Example 2) or 250 μm (Example 3). Then the same procedure as in Example 1 followed. In this way, two heat-shrinkable foamed composite films were prepared according to the present invention.

EXAMPLE 4

A heat-shrinkable foamed composite film was prepared in the same manner as in Example 1 with the exception of using an ethylene-vinyl acetate copolymer containing 15% by weight of vinyl acetate (in place of such copolymer containing 5% by weight thereof) as the starting material for the foamed film (A).

COMPARISON EXAMPLE 1

A foamed film of 400 μm thickness was produced in the same manner as in Example 1 using 100 parts by weight of an ethylene-propylene random copolymer containing 4.5 mole % of ethylene and 5 parts by weight (including 1 part by weight of foaming agent component) of a master pellet comprising sodium bicarbonate, citric acid and low-density polyethylene as the main component. Onto the film thus obtained was applied a thermoplastic film of 100 μm thickness formed by melt extrusion from the copolymer of the type as used in Example 1 although singly to give a laminate. The obtained laminate was laterally monoaxially oriented by a tenter in the same manner as in Example 1 and was found to have had cells ruptured and fuzzed sporadically in the surface of foamed layer. The oriented grain appeared in the longitudinal direction and cracks developed. In other words, the obtained product was defective. In view of this fault, the lamination was discontinued.

Table 1 shows the properties of the heat-shrinkable foamed composite films prepared in Examples 1 to 4.

TABLE 1

|  | Unit | Direction | Ex. 1 (120 μm) | Ex. 2 (250 μm) | Ex. 3 (290 μm) | Ex. 4 (120 μm) |
| --- | --- | --- | --- | --- | --- | --- |
| Density | g/cm³ | — | 0.80 | 0.38 | 0.37 | 0.80 |
| Tensile strength | kg/cm | La | 10.57 | 8.38 | 9.66 | 9.80 |
| Weatherability*1 (Tensile strength) | kg/cm | La | 9.14 | 8.25 | 9.16 | 9.60 |
| Tensile elongation*2 | % | La | 50 | 45 | 49 | 48 |
| Young's modulus | kg/mm² | La | 128 | 70 | 55 | 116 |
| Impact strength | kg/cm | — | 10.6 | 12.6 | 12.0 | 11.3 |
| Heat shrinkage factor | % |  |  |  |  |  |
| Boiled water |  | Lo | 5.0 | 5.8 | 5.1 | 5.3 |
|  |  | La | 33.7 | 37.0 | 33.8 | 34.5 |
| 60° C. |  | Lo | 0 | 0 | 0 | 0 |
|  |  | La | 0 | 0 | 0 | 0 |
| 70° C. |  | Lo | 0.8 | 0.8 | 0 | 0.5 |
|  |  | La | 1.0 | 1.0 | 1.0 | 1.0 |
| 80° C. |  | Lo | 1.8 | 2.6 | 2.0 | 2.3 |
|  |  | La | 11.0 | 11.3 | 6.9 | 11.5 |
| 90° C. |  | Lo | 2.5 | 3.0 | 3.0 | 3.0 |
|  |  | La | 22.5 | 29.8 | 27.5 | 23.5 |
| 100° C. |  | Lo | 4.3 | 4.5 | 4.1 | 4.5 |

TABLE 1-continued

| | Unit | Direction | Ex. 1 (120 μm) | Ex. 2 (250 μm) | Ex. 3 (290 μm) | Ex. 4 (120 μm) |
|---|---|---|---|---|---|---|
| Hot pack slidability*4 | g | La | 32.3 | 36.0 | 33.6 | 34.5 |
| | | SR | 175 | 195 | 210 | 180 |
| | | DR | 125 | 155 | 165 | 140 |

In Table 1, the abbreviations denote the following. La stands for lateral, Lo for longitudinal, SR for static resistance and DR for dynamic resistance. Note *1 The weatherability is expressed in terms of the tensile strength as measured on exposure to UV radiation for 60 hours by a Fade-O-meter (trademark for a device for measuring the degree of fade resistance). *2 According to JIS-K6732 *3 Impact strength as determined with a punching impact tester (having an impact ball of 0.5 in. diameter). *4 A stainless steel panel was moved at a speed of 450 cm/min carrying the covered bottles fixed thereto to determine the resistance of the sleeves on bottles (weighing 470 g, see Example 5) during the movement of stainless steel panel (dynamic resistance) and the resistance thereof at the start of movement (static resistance).

EXAMPLE 5

The heat-shrinkable foamed composite film obtained in Example 1 was slit to obtain a strip of 23.2 cm width. The sides of the strip were joined together by ultrasonic method to give a long tube. The tube was cut to make a sleeve for glass bottles. The sleeve measured 110 cm in axial length and 22.5 cm in circumference. The sleeve was applied onto a glass bottle having a maximum circumference of 21.2 cm and a capacity of 300 ml so that the the side of foamed film (A) was in contact with the outer surface of the bottle. The covered bottle was passed through a shrink tunnel to cause heat-shrinking. The sleeve was found to cover the bottle in close contact therewith from the upper end of its trunk to the peripheral end of its bottom. The result revealed that the sleeve was the desired packaging material capable of effectively preventing the breakage of bottles. The sleeve was prepared in such a manner that the lateral direction of heat-shrinkable film corresponded to the circumferential direction of the sleeve.

We claim:

1. heat-shrinkable foamed composite film which is a film laminate composed of:
   (A) a laterally monoaxially-oriented foamed film of an olefin polymer having a thickness of about 40 to about 400 μm, the film being heat-shrinkable predominantly in a lateral direction and being formed from a composition comprising (i) 100 parts by weight of a mixture of about 55 to about 90% by weight of at least one olefin copolymer selected from ethylene-propylene copolymers and ethylene-propylene-α-olefin copolymers (the α-olefin having 4 to 6 carbon atoms) having an ethylene content of about 2 to about 10 mole % and about 10 to about 45% by weight of at least one ethylene polymer selected from low-density polyethylenes and ethylene-vinyl acetate copolymers having a vinyl acetate content of up to about 30% by weight; and (ii) about 0.2 to about 5 parts by weight of a foaming agent,
   (B) a laterally monoaxially-oriented film of an olefin polymer having a thickness of about 5 to about 50 μm, the film being heat-shrinkable predominantly in a lateral direction and being formed from a composition comprising an olefin polymer, and
   (C) a laterally monoaxially-oriented printed polyester film having a thickness of about 5 to about 50 μm, the film being heat-shrinkable predominantly in a lateral direction and being formed from a composition comprising a polyester mixture of about 60 to about 90% by weight of a polyester copolymer and about 10 to about 40% by weight of polyethylene terephthalate, the polyester copolymer being prepared from terephthalic acid and/or a derivative thereof as an aromatic dicarboxylic acid component and ethylene glycol and 1,4-cyclohexanedimethanol as a diol component, the amount of 1,4-cyclohexanedimethanol in the diol component being about 15 to about 45 mole %, the film laminate being formed by laminating the films (A), (B) and (C) in this order so that the printed surface of the film (C) is disposed face-to-face with the film (B), the film laminate having a heat shrinkage factor of about 25 to about 50% in a lateral direction and 0 to about 10% in a longitudinal direction under the conditions of 100° C. for 30 seconds and has a Young's modulus of about 40 to about 170 kg/mm$^2$ in a lateral direction and a tensile strength of about 5.0 to about 15.0 kg/cm in a lateral direction.

2. A heat-shrinkable foamed composite film according to claim 1 wherein the film (B) is adhered faced-to face to the printed surface of the film (C) with an adhesive.

3. A process for preparing a heat-shrinkable foamed composite film, the process comprising joining a foamed film laminate of about 45 to about 450 μm thickness comprising a foamed olefin polymer film (A) and an olefin polymer film (B) to a printed polyester film (C) of about 5 to about 50 μm thickness to provide a laminate such that the printed surface of the film (C) is adhered face-to-face to the film (B) of the film laminate with an adhesive;

said foamed film laminate comprising the foamed olefin polymer film (A) and the olefin polymer film (B) being formed by:
(1) forcing out a composition comprising an olefin polymer by melt extrusion in the form of a sheet onto one surface of the foamed olefin polymer film (A) to give a laminate, the foamed olefin polymer film (A) being produced from a composition comprising (i) 100 parts by weight of a mixture of about 55 to about 90% by weight of at least one olefin copolymer having an ethylene content of about 2 to about 10 mole % and selected from ethylene-propylene copolymers and ethylene-propylene-α-olefin copolymers, the α-olefin having 4 to 6 carbon atoms, and about 10 to about 45% by weight of at least one ethylene polymer selected from low-density polyethylenes and ethylene-vinyl acetate copolymers having a vinyl acetate content of up to about 30% by weight, and (ii) about 0.2 to about 5 parts by weight of a foaming agent, and (2) laterally monoaxially orienting the resulting laminate to about 2 to about 8 times the original size;

said polyester film (C) being prepared by forcing out through an extruder die a composition comprising a polyester mixture of about 60 to about 90% by weight of a polyester copolymer and about 10 to about 40% by weight of polyethylene terephthalate, the polyester copolymer being prepared from terephthalic acid and/or a derivative thereof as an aromatic dicarboxylic acid component and ethylene glycol and 1,4-cyclohexanedimethanol as a diol component, the amount of 1,4-cyclohexanedimethanol in the diol component being about 15 to about 45 mole %, to give a film; laterally monoaxially orienting the film to about 2 to about 8 times the original size; and printing one surface of the film;

and said heat-shrinkable foamed composite film having a heat shrinkage factor of about 25 to about 50% in a lateral direction and 0 to about 10% in a longitudinal direction under the conditions of 100° C. for 30 seconds and a Young's modulus of about 40 to about 170 kg/mm$^2$ in a lateral direction and a tensile strength of about 5.0 to about 15.0 kg/cm in a lateral direction.

* * * * *